(12) United States Patent
Suenbuel (10) Patent No.: US 8,166,459 B2
(45) Date of Patent: Apr. 24, 2012

(54) APPARATUS AND METHOD OF GENERATING SELF-DEBUGGING COMPUTER SOFTWARE

(75) Inventor: Asuman Suenbuel, San Jose, CA (US)

(73) Assignee: SAP AG, Walldorf (DE)

( * ) Notice: Subject to any disclaimer, the term of this patent is extended or adjusted under 35 U.S.C. 154(b) by 1093 days.

(21) Appl. No.: 12/038,175

(22) Filed: Feb. 27, 2008

(65) Prior Publication Data
US 2009/0217235 A1   Aug. 27, 2009

(51) Int. Cl.
*G06F 9/44* (2006.01)

(52) U.S. Cl. ........ 717/124; 717/103; 717/106; 717/126; 717/139; 714/38.1; 714/38.14; 714/25

(58) Field of Classification Search .................. None
See application file for complete search history.

(56) References Cited

U.S. PATENT DOCUMENTS

| | | | | |
|---|---|---|---|---|
| 4,385,384 A * | 5/1983 | Rosbury et al. | ............... | 714/717 |
| 4,866,610 A * | 9/1989 | Reiners | ......................... | 717/106 |
| 4,872,168 A * | 10/1989 | Aadsen et al. | ................ | 714/720 |
| 5,446,741 A * | 8/1995 | Boldt et al. | .................... | 714/718 |
| 5,467,449 A * | 11/1995 | Gauronski et al. | .............. | 714/57 |
| 5,526,485 A * | 6/1996 | Brodsky | ...................... | 714/38.13 |
| 5,903,718 A * | 5/1999 | Marik | ......................... | 714/38.13 |
| 6,052,700 A * | 4/2000 | Eckard et al. | ................. | 708/112 |
| 6,058,307 A * | 5/2000 | Garner | .......................... | 455/428 |
| 6,083,281 A * | 7/2000 | Diec et al. | ..................... | 717/128 |
| 6,202,174 B1 * | 3/2001 | Lee et al. | .................... | 714/38.11 |
| 6,223,228 B1 * | 4/2001 | Ryan et al. | .................... | 713/375 |
| 6,226,783 B1 * | 5/2001 | Limondin et al. | ............ | 717/104 |
| 6,249,880 B1 * | 6/2001 | Shelly et al. | .................... | 714/34 |
| 6,654,903 B1 * | 11/2003 | Sullivan et al. | ............... | 714/4.12 |
| 6,973,608 B1 * | 12/2005 | Abramovici et al. | ......... | 714/725 |
| 7,146,350 B2 * | 12/2006 | Holland et al. | .................. | 706/47 |
| 7,320,114 B1 * | 1/2008 | Jain et al. | ....................... | 716/106 |
| 7,475,316 B2 * | 1/2009 | Cowell et al. | .................. | 714/734 |
| 7,669,064 B2 * | 2/2010 | Johnson et al. | ............... | 713/300 |
| 2003/0140278 A1 * | 7/2003 | Holland et al. | .................. | 714/25 |
| 2003/0154426 A1 * | 8/2003 | Chow et al. | ...................... | 714/30 |
| 2004/0006546 A1 * | 1/2004 | Wedlake et al. | ................ | 706/46 |
| 2004/0031030 A1 * | 2/2004 | Kidder et al. | .................. | 717/172 |
| 2004/0153786 A1 * | 8/2004 | Johnson et al. | .................. | 714/25 |
| 2004/0205420 A1 * | 10/2004 | Seeley et al. | ..................... | 714/57 |
| 2006/0123389 A1 * | 6/2006 | Kolawa et al. | ................ | 717/101 |
| 2008/0201705 A1 * | 8/2008 | Wookey | .......................... | 717/175 |
| 2009/0204591 A1 * | 8/2009 | Kaksonen | .......................... | 707/3 |

(Continued)

OTHER PUBLICATIONS

Title: Using regression trees to classify fault-prone software modules, author: Khoshgoftaar, T.M et al, source: IEEE, dated Dec. 10, 2002.*

(Continued)

*Primary Examiner* — Chameli Das
(74) *Attorney, Agent, or Firm* — Fountainhead Law Group PC (57) ABSTRACT

In one embodiment the present invention includes a computer-implemented method of self debugging a computer program operating in a distributed processing environment. The method includes detecting a fault in a plurality of processing devices and classifying the fault according to fault classifications. The fault classifications have corresponding responses. The method further includes executing one of the responses in accordance with the fault having been classified. The method further includes revising the computer program according to the response. This method may be embodied in a computer program or executed by a computer system. In this manner, the computer program performs self debugging.

20 Claims, 7 Drawing Sheets

U.S. PATENT DOCUMENTS

2011/0225461 A1* 9/2011 Wookey ........................ 714/38.1

OTHER PUBLICATIONS

Title: An automated testing methodology based on self-checking software, author: Reinhart T et al, source: IEEE, dated: Jul. 13, 1998.*

A. Avi Zienis. Fault-Tolerant Systems. IEEE Transactions on Computers, 25(12):1304-1312, Dec. 1976.

V.B. Bajaj and A.K. Sarje. A comparative study of two self healing protocols for ATM Networks. International Journal of High Speed Computing (IJHSC) 10(3):235-256, 1999.

T. Chen. Fault diagnosis and Fault Tolerance. Chapter 5, pp. 135-156. Springer, Berlin, 1992.

H.W. Chong and S. Kwong. A generic algorithm for joint optimization of spare capacity an delay in self-healing network. In W.B. Langdon, E.Cant u-Paz, K.Mathias, R.Roy, D.Davis, R.Poli, K.Balakrishnan, V.Honavar, G Rudolph, J.Wegener, L.Bull, M.A. Potter, A.C.Schultz, J.F.Miller, E.Burke, and N.Jonaska, editors, GECCO 2002: Proc. of the Generic and Evolutionary Computation Conf., p. 1260, NY, Jul. 9-13, 2002. Morgan Kaufmann Publishers.

David Culler and Students. Motes project. http://webs.cs.berkeley.edu/tos/. Feb. 27, 2008.

S.Dolev and T.Hermann. Parallel composition of stabilizing algorithms. In 19th International Conference on Distributed Computing Systems (19th ICDSC'99) Workshop on Self-Stabilizing Systems, Austin, Texas, Jun. 1999. IEEE.

S.Dolev and E.Schiller. Communication adaptive self-stabilizing group membership service (extended abstract). In WSS: International Workshop on Self-Stabilizing Systems, LNCS, 2001.

W.R. Elmendorf. Fault-Tolerant Programming. In Proc. 2nd Int. symp. on Fault Tolerant Computing (FTCS-2), pp. 79-83, Newton, MA, USA, 1972. IEEE Computer Society Press.

D. Garlan and B. Schmerl. Model-Based Adaptation for Self-Healing Systems. Technical Report, Carnegie Mellon University, Pittsburgh, PA. 2002.

H. Hecht. Fault-Tolerant Software. IEEE Trans. on Reliability, R-28:227-232, 1979.

IBM, Eliza: self-managing servers. http://www-03.ibm.com/servers/automatic dated Jul. 31, 2008.

D. Liu and P. Ning. Efficient Self-Healing Group Key Distribution with Revocation Capability. Technical Report TR-2003-03, Department of Computer Science, North Carolina State University, Jan. 28, 2003. Wed, Jan. 29, 2003 01:39:43 GMT.

G. Musser. Robot, Heal Thyself. Computer that fix themselves are the first application of artificial self-replication. Scientific American, 285(2): 40-41, Aug. 2001.

D.L. Parnas. The Use of Precise Specifications in the Development of Software. In Proceedings of IFIP Congress 1977. North Holland Publishing Company, 1977.

* cited by examiner

APPARATUS AND METHOD OF GENERATING SELF-DEBUGGING COMPUTER SOFTWARE

CROSS REFERENCE TO RELATED APPLICATIONS

Not Applicable.

BACKGROUND

The present invention relates to fault-tolerant computer software, and in particular, to self-debugging computer software.

Unless otherwise indicated herein, the approaches described in this section are not prior art to the claims in this application and are not admitted to be prior art by inclusion in this section.

The way current software engineering faces system design is characterized along the traditional tasks of analysis, design and implementation. When a system starts operating, the presence of a security attack, threat, or any vulnerability causes in the majority of cases the whole system rendered to be useless, in other words, the system "dies". Hand made solutions are nice, but in many cases too late, expensive, and time consuming.

Much work has been done on developing fault-tolerant and self-stabilizing systems to address these problems. However, these systems are difficult to build and often error prone themselves. In fact, many actual system failures have resulted not from external faults, but from bugs in fault-tolerant software that occurred with no external faults.

The research community's response was to do formal verification of fault-tolerant and self stabilization algorithms, and much interesting research has been undertaken in this area. However this research is unlikely to directly result in the ability to effectively produce robust self-debugging systems. This is because the work is focused on analysis of algorithms usually specified in a some formal language. This leaves a large gap between what was analyzed and what is deployed. Additionally this research only addresses fault-tolerance and not self-debugging.

Thus, there is a need for improved reliability in software systems. The present invention solves these and other problems by providing a system and method of generating self-debugging computer software.

SUMMARY

Embodiments of the present invention improve the reliability of software systems. In one embodiment the present invention includes a computer-implemented method of self debugging a computer program. The computer program operates in a distributed processing environment. The method includes detecting a fault in processing devices operating in the distributed processing environment. The method further includes classifying the fault into fault classifications. The fault classifications have corresponding responses. The method further includes executing one of the responses in accordance with the fault having been classified. The method further includes revising the computer program according to the response.

According to another embodiment, a computer program implements the above-described method. The computer program includes subprograms that perform the designated task of the computer program and a debugging program that performs the debugging based on faults detected in the subprograms.

According to another embodiment, a computer system executes the above-described computer program. The computer system includes processing devices that execute the subprograms. One or more of the processing devices executes the debugging program.

The following detailed description and accompanying drawings provide a better understanding of the nature and advantages of the present invention.

DETAILED DESCRIPTION

Described herein are techniques for generating self-debugging computer programs. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Rather than trying to eliminate computer crashes—probably an impossible task—we need to concentrate on designing systems that recover rapidly when mishaps do occur. Our initial step was to see what we could learn from previous failures. Specifically, how can we design systems that enable self-debugging? The notion "self-debugging" as used in computer science is a generic topic that can be achieved through many ways. A lot of the approaches in the literature deal with recovery-oriented computing (ROC). Self-debugging is a property of a software system. The means to achieve self-debugging is versatile, such as other system properties, e.g. scalability or robustness. Also, we found some approaches that try to mimic the immune system. So far, the programming model to achieve self-debugging seems to be fundamentally different as outlined in more detail below.

Embodiments of the present invention overcome the problems discussed above by using a generative approach to building self-debugging systems. This approach addresses the gap between what is analyzed and what is deployed by generating executable code in a correct-by-construction manner from specifications of fault-tolerance, self-stabilization and other aspects of self-debugging systems. This generative approach can also address the problem of self-debugging by in some sense mimicking nature's approach to self-debugging in its immune response strategy. There are four stages in nature's immune response strategy that we will mimic:

(1) Recognition: The system recognizes that it is being attacked or could become a possible target for attacks.

(2) Classification: The ability of the system to determine the type of attack, or the harm that could be applied to the system.

(3) Response: Once the system recognizes the type of attack, it activates its own rules and mechanisms to defend itself and to overcome the attack.

(4) Protection: The ability of the system to build protection against predictable attacks or possible attacks and combination of security leaks that may lead to an attack.

In technical terms the first aspect is providing models and concepts and synthesize from there provably correct self-debugging code. The second aspect is to tell the runtime system to purposefully perceive and respond to harmful changes in a self-protecting way and reflect those changes at the specification level. The emphasis lies on the term generating, because we define a reflective, correct-by-construction approach to self-debugging software systems. The end result is to provide provably correct applications, where in our case the correctness of a system in particular is defined by means of self-debugging properties.

As further detailed below, we will motivate our approach to provide self-debugging software applications and will present an overview of the concepts as well as some implementations regarding how those may be realized technically.

1. Self-Debugging in Biology

Inspired by biology, a worm is the epitome of a self-debugging "system". If a worm has been cut in half and if the head survives, the head end will usually regenerate a new tail end for itself. Of course, more complex animals such as mammals generally do not have the ability to regenerate a non-negligible part of its own body. However, mammals do exhibit the ability of cell regeneration and their immune systems respond to diseases and build up possible protection, which we see as a major step in self-debugging. We observe also when a mammal looses its rear legs, the act of locomotion is being performed through other means e.g. front legs or by creeping. Mammals of higher level of intelligence are even able to construct an instrument which enables them to substitute their missing functionality.

Self-debugging describes any device or system that has the ability to perceive that it is not operating correctly and, without human intervention, make the necessary adjustments to restore itself to normal operation. Fixing non-correct operation involves runtime adaptation.

A functional self-debugging system locates and isolates problems and then executes a remedy. A prerequisite for this task is the ability of the system to recognize the "danger", to hold off or fight the intruder, and finally to take actions to protect the system from future contact.

In the process of self-debugging, there are major stages:

(1) Recognition: The system recognizes that it is being attacked or could become a possible target for attacks.

(2) Classification: The ability of the system to determine the type of attack, or the harm that could be applied to the system.

(3) Response: Once the system recognizes the type of attack, it activates its own rules and mechanisms to defend itself and to overcome the attack.

(4) Protection: The ability of the system to build protection against predictable attacks or possible attacks and combination of security leaks that may lead to an attack.

Recognition: As in the human body's immune system, the recognition phase establishes self-preservation rules that are important for a system's own survival. They help to determine what it means to be attacked, what it means to become a possible target for attacks, and what it means to keep alive. The human immune system works in a similar way. Its rules are formulated for instance as follows: recognize undefined malicious substances or causative organisms either in the system or the ones trying to enter it, and trigger further actions.

Classification: The body identifies the intruder by matching the intruders structure and behavior to its known patterns. One such a pattern might for instance be that the body knows that viruses are non-living biological units containing DNA bundles but need to enter a living cell in order to reproduce or that some bacteria are live, single-cell organism which can infect tissues The body also knows that some bacteria (probiotics) are beneficial. The body knows to classify these intruders, because either it was previously exposed to the intruder and it has stored the type and defense strategy, or the intruder is recognized as such only because it matches some abstract intruder specification. If the intruder specification doesn't match any existing rule specification, the problem is formulated as a decomposition of problems. The body tries to partially evaluate solutions and apply known attacking rules.

Response: The system responds to the intruder in order to defend itself. The strength, duration, and the type of the attack/response is based upon known neutralization or intruder destroying strategies that might come from a previous determination step. Examples of strategies in biology are, e.g., activate the macrophages to ingest and destroy (to phagocyte) foreign particles, microbes and antigens; extract its structure, differentiate its nature and trigger actions to store the antigen for possible future contact.

Protection: The system learns how to fight a certain type of intruder or it recognizes how to protect itself in a hypothetical dangerous situation. This means that the system can adapt itself to new kinds of attacks and thereby extend its protection mechanism.

In the following, we will outline our approach to self-debugging software development based on these observations.

2. Specifying Self-debugging Systems

In this section, we introduce our approach for generating self-debugging systems. The emphasis lies on the term generating, because we define a reflective, correct-by-construction approach to self-debugging software systems. Our ultimate goal is to provide provably correct applications, where in our case the correctness of a system in particular includes self-debugging properties. In practice the complete specification and derivation of a complex software system is not possible. Using our approach we hope that building in self-debugging capabilities can help a software system with residual bugs behave in a more robust manner. According to one embodiment, our approach uses the basic concepts and expressive power of code generator COGE that allow users to precisely specify the desired functionality of their applications and to generate provably correct code based on these requirements. At the core of the design process in COGE lies stepwise refinement, in which users begin with a simple, abstract model of their problem and iteratively refine this model until it uniquely and concretely describes their application.

Self-debugging is associated with both the capability of a software system to deal with runtime failure and to adapt to changes in its environment. For example, the performance of a system may be adjusted depending on the availability of resources Making an analogy with human nature, this would be related to the process of a body sweating in order to regulate its temperature. The learning-from-failures part of self-debugging can be compared in biology with the development of new species, which has evolved from its predecessor(s) by means of adaptation to new environments.

One aspect of our approach is to provide concepts and tool support for 1) the synthesis of provably correct self-debugging code, 2) the facility of the running system to purposefully perceive and respond to harmful changes, and 3) the re-synthesis of the executable code based on the detected changes in the environment. The way these goals are achieved is sketched in FIG. 1.

Figure 1:
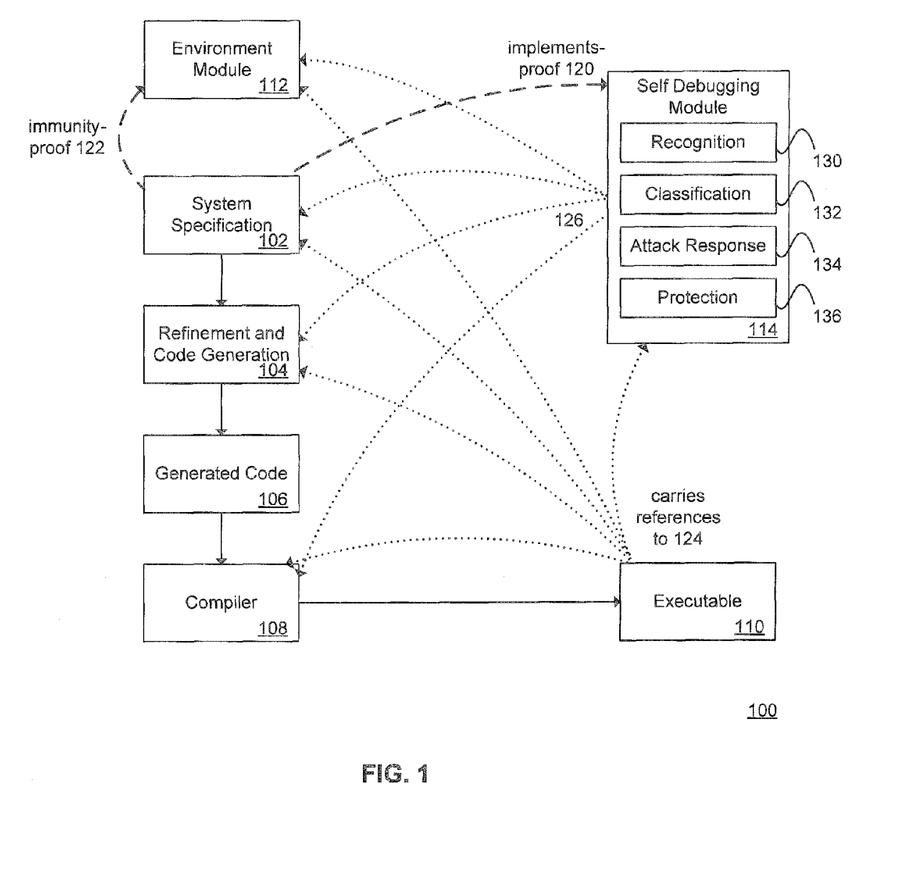
FIG. 1 is a block diagram of a system according to an embodiment of the present invention.

FIG. 1 is a block diagram of a system 100 that illustrates the main conceptual constituents of our approach and the relationships among them, according to one embodiment of the present invention. The system 100 includes a system specification module 102, a refinement and code generation module 104, a generated code component 106, a compiler 108, an executable code component 110, an environment module 112, and a self-debugging module 114. The system 100 may be implemented as computer software and related data executed by one or more computer systems, as more fully detailed in subsequent sections.

The system specification module 102 stores a high-level specification of the task to be performed by the system 100. The development of a system starts from the high-level specification describing the application-specific logic.

The refinement and code generation module 104 uses semantics-preserving transformation steps to convert the specification into more concrete representations; a representation on a lower level adds more concrete information to the one in the more abstract level.

The generated code component 106 stores the code generated by the refinement and code generation module 104.

The compiler 108 compiles the generated code stored in the generated code component 106 according to a targeted hardware or operating system.

The executable code component 110 stores the executable code compiled by the compiler 108. The executable code is ready to be deployed on the targeted hardware or operating system.

The embodiment of FIG. 1 may be used to implement the COGE programming model.

Before describing the environment module 112 and the self-debugging module 114, the logical framework behind FIG. 1 is described. As discussed above, this logical framework may be implemented as part of the computer software that embodies the system 100.

Informally, a system "R is refined by S, which is written "R $\sqsubseteq$ S if the following four criteria are met:

1. The set of types defined in R, is a subset of the set of types defined in S. That means that the refined version of a system may add additional types but also has to keep the ones defined in the more abstract version.

2. Analogously, the set of views defined in R is a subset of the set of views defined in S.

3. For each component $c_r$ in R a refined version $c_s$ is contained in S. A component $c_R$ is refined by a component $c_S$, which is written $c_R$ is a subset of $c_S$, if one of the following conditions is fulfilled:

3a. $c_r$ is equal to $c_s$

3b. $c_R$ and $c_S$ define the same set of export services; in the refined version, the component may define import service and export services may additionally define import structure. It is an error, if $c_R$ already defines import services and $c_S$ is not equal to $c_R$. In other words, a component defining import services cannot be further refined. This restriction is justified by the fact, that additional import services may introduce inconsistencies in a consistent system specification.

4. For each connector cn in R either the same connector is contained in S, or there exists a component cni that refines the connector in S. A connector cn in R is refined by a component cni in S, if the following three criteria are met:

4a. cn and cni have the same name;

4b. cni exports a service that matches the import service of cn;

4c. cni imports a service that matches the export service of cn

That means that a component in S may refine multiple connectors having the same name in R by exporting and importing more than one service. In order to represent the refinement relation between systems, we introduce the following relation:

--- relation IsRefinedBy(R : System, S : System)
We will use the notation "R $\sqsubseteq$ S" as a synonym for "IsRefinedBy(R, S) = true".

---

Analogously to the CheckMode universe, we define a universe RefinementCheckMode for representing the different phases of the refinement consistency check; the 0-ary function is used to determine the actual phase and is initialized with rc_check_types:

--- universe RefinementCheckMode =
 {rc_check_types,rc_check_views,
  rc_check_components,rc_check_connectors}
function rc_mode → RefinementCheckMode ← rc_check_types

---

For representing the refinement that is currently checked, we introduce the following universe and function definitions:

--- universe Refinement = { $\sqsubseteq$ (R : System, S : System)}
function current_refinement → Refinement

---

The following chunk represents the top-level structure of the refinement consistency check. The algorithm iterates over all refinement relations defined in the system by means of the chosen construct. For each of these refinement relations the different categories of constituents of the participating systems are checked, namely the type, view, component, and connector specifications.

---

Check Consistency of System Refinement
 if current_refinement =~ R $\sqsubseteq$ S then
  if rc_mode = rc_check_types then
   RefinementCheckTypes(R, S)
  elseif rc_mode = rc_check_views then
   RefinementCheckViews(R, S)
  elseif rc_mode = rc_check_components then

```
        RefinementCheckComponents(R, S)
    elseif rc_mode = rc_check_connectors then
        RefinementCheckConnectors(R, S)
    endif
else
    choose R in System, S in System :
            (¬(refinement_visited(R, S))
            ∧ IsRefinedBy(R, S))
        current_refinement := R ⊑ S
        rc_mode := rc_check_types
    endchoose
endif
```

In the following, we will present the consistency rules for the particular category in more detail, refinement check of type and view specifications. As already mentioned, types and views are regarded as global entities that are shared by all system specifications on all level of abstractions. For that reason, the refined version must contain the identical elements of the Type and View universe as the abstract counterpart. However, the rules do not forbid that the refined system declares new types and views. The corresponding rules are given by the following chunks:

```
RefinementCheckTypes(R : System, S : System) ≡
    if (∃t ∈ SystemTypes(R) : ¬(t ∈ SystemTypes(S)))
        then
            error_missing_types_in_refinement(R, S)
        endif
    rc_mode := rc_check_views
RefinementCheckViews(R : System, S : System) ≡
    if (∃v ∈ SystemViews(R) : ¬(v ∈ SystemViews(S)))
        then
            error_missing_views_in_refinement(R, S)
        endif
    rc_mode := rc_check_components
```

Refinement check of components: The refinement of component descriptions is described using the rules contained in the following chunk. The choose construct selects the components in R and S that have to be checked against each other. As one can see, the name of the components is used to identify them. The function component_refined is used to map the components in R to their refined versions in S. This function is at the same time used to mark, whether a component refinement has already been processed.

```
RefinementCheckComponents(R : System, S : System) ≡
    choose c_R in Component, c_S in Component :
            (ComponentName(c_R) = ComponentName(c_S))
            ∧ (c_R ∈ SystemComponents(R))
            ∧ (c_S ∈ SystemComponents(S))
            ∧ (component_refined((R, S, c_R)) = undef ))
        component_refined((R, S, c_R)) := (S, c_S)
        if Imports(c_R) ≠ { } then
            if ¬(c_R ⊑ c_S) then
                error_in_component_refinement(c_S,
                    "refined component must be equal to the abstract one")
            endif
        elseif ¬(c_R ⊑^r c_S) then
            error_in_component_refinement(c_S,
                "refined component must define the same"+
                "export services than the abstract one")
        endif
    ifnone
        if (∃c ∈ SystemComponents(R) :
                component_refined((R, S, c)) = undef ) then
            error_missing_components_in_refinement(R, S)
```

```
        endif
        rc_mode := rc_check_connectors
    endchoose
```

Finally, we need also to check whether the connecting elements are also equally checked via equal conditions:

```
let equal_cond =
        (ConnectorExportServiceName(cn_R)
        = ConnectorExportServiceName(cn_S))
    ∧ (component_refined(
            (R, S, ConnectorExportServiceComponent(cn_R)))
        = (S, ConnectorExportServiceComponent(cn_S)))
    in
    if ¬equal_cond then
        (Check Connector Refinement)
    endif
endlet
```

In our approach we are especially interested in the generation of code that has certain self-debugging properties. We can achieve this by formulating a Self-debugging Model and then prove that the system specification meets the properties expressed in this model. This concept is part of the correct-by-construction idea.

In FIG. 1, this relationship is shown by the implements-proof pathway 120 between the system specification module 102 and the self-debugging module 114. At the same time, the Self-debugging module 114 can be used as a starting point for the development of the specification by adding application-specific features to the abstractly formulated Self-debugging model. In this case, the implements-proof pathway 120 directly arises from the construction process.

In nature, organisms often know how to fight certain kind of attacks from the outset; the defense strategy against these known attacks is already contained in these organisms. The Environment Module 112 mirrors this relationship: it contains an environment model, which is all known security attacks and faults that the system can fight without being changed. An Immunity-Proof pathway 122 is given in order to show that a given system specification is immune against a given set of possible security attacks and system faults, i.e. that is does not fail in the presence of one of these events. So far we have only covered those self-debugging issues that do not require any change of the running system itself. In order to achieve full self-debugging, we investigate the case that the current instance of the system might not be capable of optimally dealing with new kinds of challenges without being changed. Examples for these challenges include unknown security attacks and unforeseen events coming from the environment. That means that the running system 100 is aware of this kind of contingencies and adapts itself to changing environments by synthesizing its own program code. In our framework, this concept is not sufficient, because we are dealing with the overall system specification rather than the executable code itself, especially in order to maintain the system-wide self-debugging properties. Whenever the system 100 detects that it needs to be adapted as a result of changes in its environment, a re-synthesis of the executable code based on the modified environment model is triggered. Thus, our framework ensures correctness with respect to the original Self-debugging model and a (possibly changed) environment model.

On the technical side, this approach implements a much powerful and resource intensive "regeneration machinery", because the executable code alone is no longer sufficient to perform the generation of a new "species", a term that we will use for the new version of an application as a result of a re-synthesis step. According to one embodiment, the method of solving this problem is the use of the principle of contractually specified interfaces. Hereby, the executable code carries information about its own specification (see the executable code component 110 in FIG. 1). For the regeneration, the running code also carries information regarding its environment and self-debugging model (see the environment module 112 and the self-debugging module 114), as well as the refinement and code generation module 104 that has been used in the development process. These relationships are illustrated by the "carries references to" pathways 124.

When the system 100 comes under a so far unknown attack it tries to overcome this situation by applying general strategies to return to normal operation. During this process, the system 100 records the actions taken and uses them for the derivation of an optimal strategy for the new kind of attack. With this information, the environment model is augmented with information describing the new attack; the strategy how to fight this attack is used by the synthesis engine (see the refinement and code generation module 104 and the compiler 108) to regenerate the executable code. These protection pathways are illustrated by the pathways 126.

The Self-debugging Module 114 contains the rules and properties that the system obeys in order to be called self-debugging.

According to our model presented in Section 1 above (Self-Debugging in Biology), we distinguish four sub-modules of the Self-debugging Module's common part (see FIG. 1): a recognition module 130, a classification module 132, a response module 134, and a protection module 136.

The recognition module 130 contains the logic for recognizing the fact that the system 100 is under attack. It can be seen as a kind of monitor for the overall system behavior; the recognition module 130 expresses the ability of the system 100 to distinguish between legal and illegal states of execution.

The classification module 132 expresses rules and properties to further identify the kind of attack that the system 100 is facing. The rules in the classification module 132 embody the idea of distinguishing between unknown and known attacks; for unknown attacks they may also further analyze the general class of attack the system 100 is facing.

The response module 134 contains the rules for actually eliminating the attacker by activating the appropriate defense mechanisms depending on the attack classification result. This means that after the execution of any of the possible defense operations the system is again in a legal state.

The protection module 136 implements the steps for learning from the response. The properties describing the protection mechanisms of the self-debugging system are capable of reflecting about the steps that have been carried out during the response. The protection module 136 expresses the fact that the system is able to learn new defense strategies by 1) recording the actions taken during the attack response, 2) the ability to abstract from the concrete attack to a class of (similar) attacks, 3) adjusting the environment model in order to capture the newly acquired knowledge, and 4) triggering the previously mentioned regeneration process based on the adapted model.

Each of these modules represents the biologically inspired rules and properties of the respective phase as outlined in Section 1 above. The entirety of these modules expresses our notion of self-debugging according to an embodiment of the present invention. In the following section, we will detail the Self-debugging Module 114 more technically.

3. Technical Realization of Self-debugging

In this section, we introduce additional technical details regarding the self-debugging system introduced above.

In our approach, we assume that the system is given as a state-transition machine description. In particular, for describing the system behavior, we will use state machines, because it provides compositionality properties that we need in our self-debugging approach. Contractually specified interfaces capture the essential information about the structure and behavior of (a part of) a system: The structural specification of a module captures the logical functionality of a module (what the module achieves) using algebraic specifications and categorical diagrams; the behavioral specification of a module captures the operational method a module uses to achieve its functionality. With a "mapping" composition operator it is possible to provide state machines description for several aspects of a system separately and then combine these machines to a single state machine using the mapping operation. In our approach, we will especially make use of this property by separating the application-specific part of the system from the self-debugging parts of it. The entire system is given by the combination of these parts provided by the categorical mapping operator. We can therefore focus on the "self-debugging machine", which implements that aspect of the system responsible for the self-debugging functionality.

In our model, we consider the set of all possible states the system can be to be partitioned into legal states $S_L$ and illegal states $S_I$. Legal system states describe "normal" system execution; if the system's states is part of the illegal states then the system is infected meaning that some kind of security attack and/or fault has occurred. This is the starting point for the self-debugging process, whose goal it is to cause the system to return to its "normal" operation.

From a technical point of view, we assume the self-debugging functionality to be given as a state machine model. By this we are able to use well-defined notions of composition and refinement of specifications in our code synthesis process.

Figure 2:
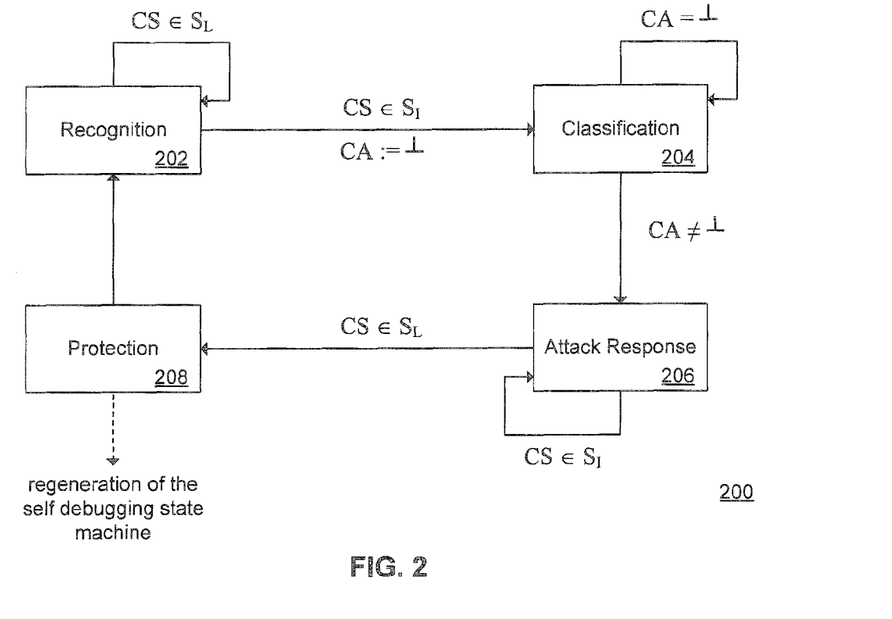
FIG. 2 is a block diagram of a self-debugging process modeled as a high-level state machine according to an embodiment of the present invention.

FIG. 2 shows an abstract view of the self-debugging process modeled as a high-level state machine 200. The state machine 200 includes a recognition state machine 202, a classification state machine 204, an attack response state machine 206, and a protection state machine 208. The state machine 200 may be implemented as a computer program executed on one or more computer systems (as more fully described in subsequent sections).

In FIG. 2, nodes represent state machines, and edges represent state transitions (optionally labeled with a predicate specifying the condition under which the transition fires). State machines can be refined to submachines such that the arrows connected to the abstract state are connected to inner states in the more concrete representation. The Self-debugging state machine 200 is initially in a state where it tries to detect abnormal situations. The transitions are labeled accordingly, whereby CS refers to the current state of the overall system.

The Recognition state machine 202 represents a busy-waiting process that gets only activated if CS is illegal, i.e. CS $\in S_I$. The notation CA:=$\bot$ (undefined) denotes an update of the state variable CA, which stands for "current attack". It is set to the value representing " undefined" modeling the fact that when entering the Classification state the current attack has not been analyzed and classified yet. The determination of this information is the task of the classification state machine 204; it is exited if CA is set to a value different from "undefined".

The "Attack Response" state machine 206 contains the self-debugging strategies depending on the classification result stored in CA. These strategies consist of general rules to fight unknown security attacks and specialized rules as a result from a previous learning step. The "Attack Response" state is only exited if the system has returned to a legal state, meaning that the attacker has been successfully defeated.

The protection state machine 208 implements the decision whether the security attack/fault that has just been eliminated can be used to regenerate the self-debugging state machine 200 itself or whether it simply leaves it unchanged and returns the control back to the Recognition state machine 202.

Figure 3:
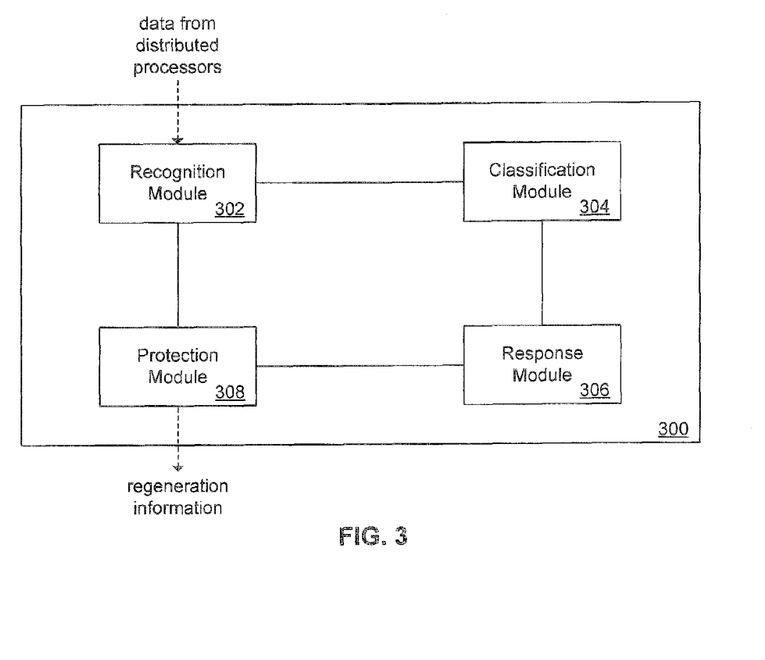
FIG. 3 is a block diagram of a self-debugging computer program that may be used to implement the self-debugging state machine of FIG. 2.

FIG. 3 is a block diagram of a self-debugging computer program 300 that may be used to implement the self-debugging state machine 200 (see FIG. 2). The computer program 300 includes a recognition module 302, a classification module 304, a response module 306, and a protection module 308. The self-debugging computer program 300 operates in a distributed processing environment. That is, the self-debugging computer program 300 is part of a larger software system (see FIG. 1) that is configured to perform a task. The larger software system include subprograms executed on one or more distributed processors. The self-debugging computer program 300 operates to perform debugging of the larger software system.

The modules 302, 304, 306 and 308 include subprograms that perform the functionality of the modules. The modules 302, 304, 306 and 308 may also include or communicate with data structures that store data used by the modules. For example, the recognition module 302 may store data that corresponds to faults that it is capable of identifying. The classification module 304 may store data that corresponds to a procedure to execute that corresponds to a recognized fault.

Figure 4:
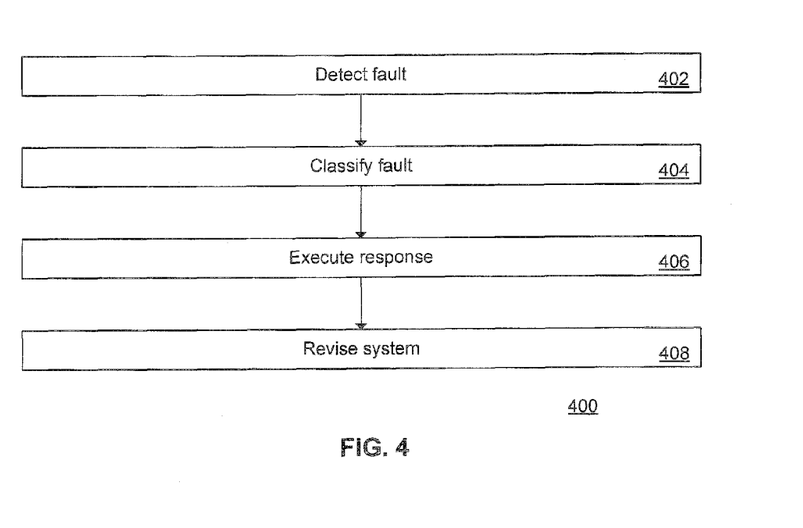
FIG. 4 is a flowchart of self-debugging method of operating the self-debugging computer program of FIG. 3.

FIG. 4 is a flowchart of self-debugging method 400 of operating the self-debugging computer program 300 (see FIG. 3).

In step 402, the recognition module 302 detects a fault in the distributed processing environment. The fault may be one or more faults in one or more of the distributed processors in the distributed processing environment. The fault may be, for example, that one of the distributed processors provides data that does not agree with data provided by other of the distributed processors.

In step 404, the classification module 304 classifies the fault into one or more fault classifications. The fault classifications contain information regarding known faults as well as a response for each fault. For example, for a fault classified as a data discrepancy fault, the response may be to roll back processing by one or more of the distributed processors.

In step 406, the response module 306 executes the response identified by the classification module 304. For example, for the rollback processing response, one or more of the distributed processors undo their changes to data back to a certain timestamp or other point where the data discrepancy did not exist.

In step 408, the protection module 308 determines whether the executed response involves revising the larger software system, and if so, it revises the larger software system (see FIG. 1) according to the response.

The self-debugging computer program 300 may implement numerous strategies for revising the larger software system. According to one embodiment, the protection module 308 may send instructions to the distributed processors to modify their behavior. These instructions may be configuration information, or may be regenerated code (see FIG. 1), for modifying or changing the software operating on the distributed processors (note the pathways 126).

According to another embodiment, the protection module 308 interacts with the system specification module 102 or the environment module 112 or both (see FIG. 1). The protection module 308 may, according to the response, revise the model specification or the environment model. The protection module 308 may then instruct the refinement and code generation module 104 and the compiler 108 to regenerate the computer program from the revised model specification (note the pathways 126).

Figure 5:
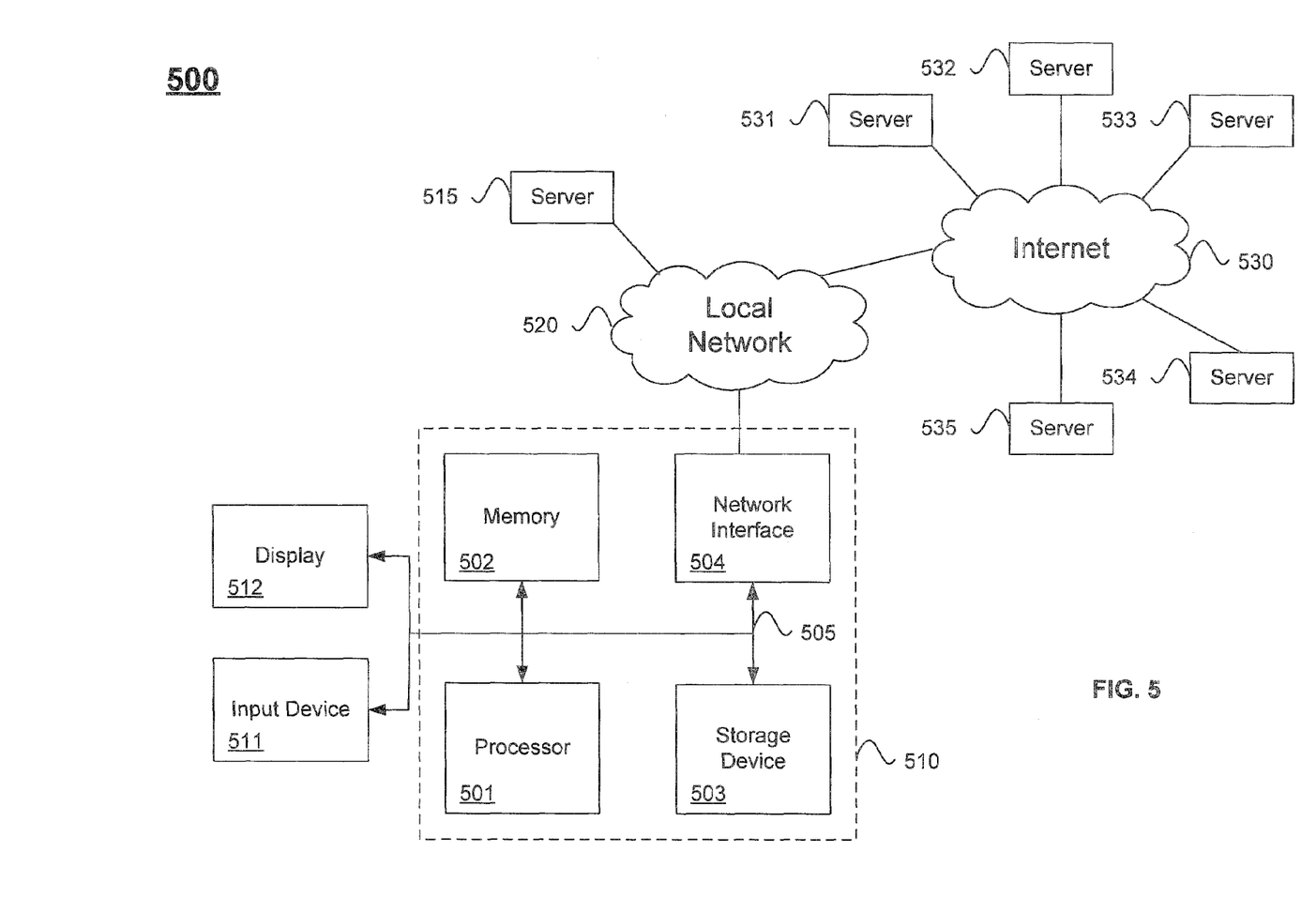
FIG. 5 is a block diagram of a computer system that may be used to implement the software system discussed with reference to FIG. 3 and FIG. 4.

FIG. 5 is a block diagram of a computer system 500 that may be used to implement the software system discussed above with reference to FIG. 3 and FIG. 4. The computer system 500 includes a local computer system 510 and remote servers 515, 531, 532, 533, 534 and 535.

The computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, including recognition, classification, response, and protection, for example. This memory may also be used for storing temporary variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques or embodying the constructs above, for example.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 504 sends and receives electrical, electromagnetic, or optical signals that carry digital data streams representing various types of information.

Computer system 510 can send and receive information, including messages or other interface actions, through the network interface 504 to an intranet or the internet 530. In the internet example, software components or services may reside on multiple different computer systems 510 or servers 531, 532, 533, 534 and 535 across the network. A server 531 may transmit actions or messages from one component, through the internet 530, local network 520, and network interface 504 to a component on computer system 510.

The servers 515, 531, 532, 533, 534 and 535 may implement a distributed software application. In such a case, the computer system 500 is said to operate in a distributed processing environment. Each of the servers 515, 531, 532, 533, 534 and 535 may implement a localized part of the overall software application. These localized parts may be referred to as subprograms of the overall software application.

A more specific application of the embodiment of FIG. 5 as applied in a business logic environment is described below with reference to FIG. 8.

4. Example Application: Sensor Nodes

Figure 6:
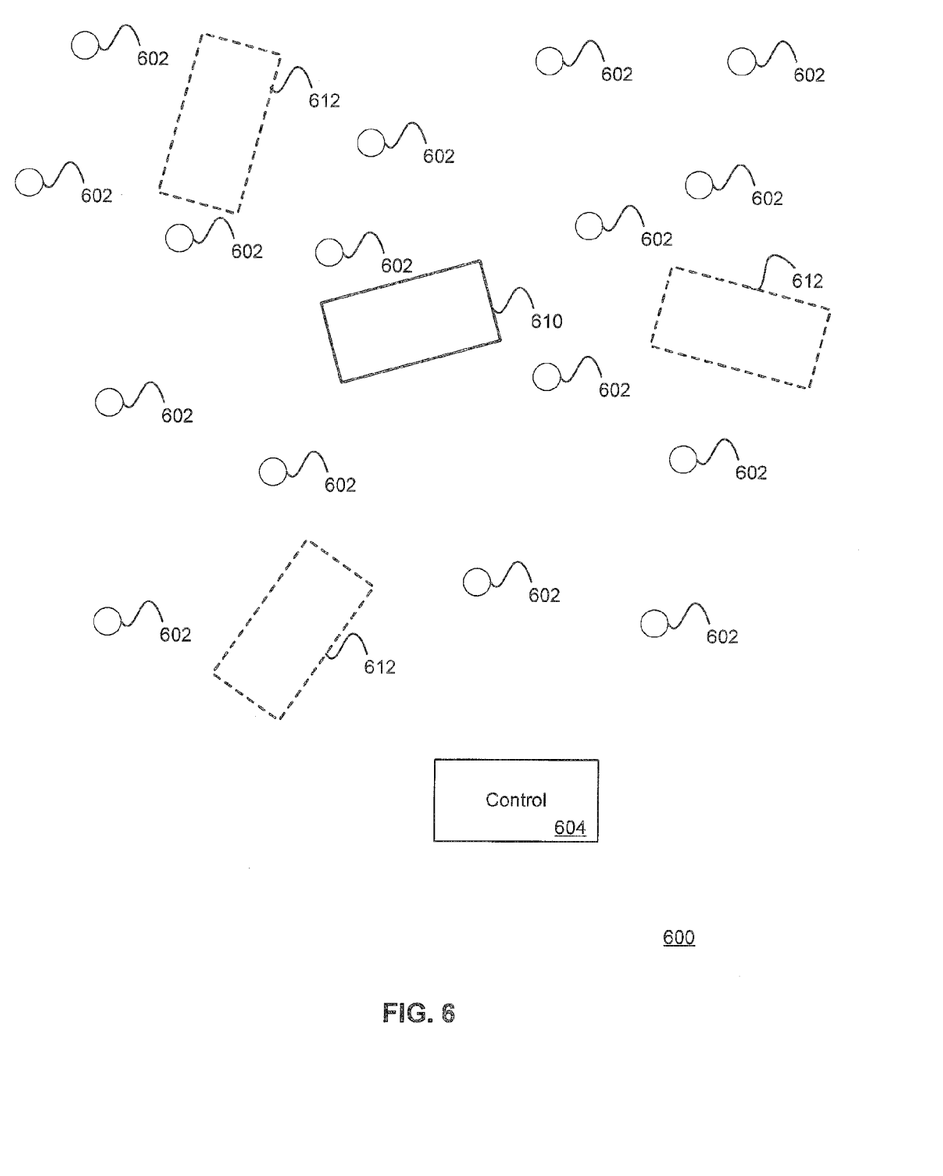
FIG. 6 is a block diagram of a sensor system according to an embodiment of the present invention.

FIG. 6 is a block diagram of a sensor system 600 according to an embodiment of the present invention. The sensor system 600 includes a plurality of sensor nodes 602 and a control node 604. The sensor nodes 602 may be, for example, a type of sensor referred to as a Berkeley mote. The sensor system may implement the computer program and method described above with reference to FIG. 3 and FIG. 4. More specifically, the control node 604 may implement the computer program 300 and the method 400.

The sensor nodes 602 may operate in a highly failure prone environment. The sensor nodes 602 set up wireless networks of communicating sensor devices. The sensor nodes 602 are tiny hardware devices equipped with sensors and communicate with each other using radio signals. The sensor nodes 602 individually have limited computing capacities, so that the exchange of information is an issue for successfully running algorithms on these devices. Typical applications for the sensor nodes 602 include target tracking, where hundreds of motes are spread over an area and they collectively try to localize objects (targets) that are moving in that area, where each mote uses its own sensor data as well as data sent from neighboring motes. The collective result may then be forwarded to the control node 604 where the information is further evaluated. The control node 604 may be a more capable computing device such as a personal computer.

To illustrate this embodiment, a target tracking application is used. The target tracking application is equipped with a general self-debugging functionality, which we explain in the following. One of our approach's key issues that we want to illustrate through the example is that the system as a whole has the self-debugging property; the code that runs on the individual devices is not necessarily self-debugging. The self-debugging is expressed in the specification of the entire application from which we are able to synthesize executable code for the individual hardware devices. We now further explain the functioning of the self-debugging part of the enhanced target tracking application on motes. The example presentation is along the lines of the self-debugging computer program 300 (see FIG. 3), covering the phases of recognition, classification, response, and protection. As the target tracking algorithm itself, all these tasks may also be executed on the motes in a distributed manner.

4.1. Recognition

The task of the recognition phase is to detect that the system is exposed to some kind of (security) attack and/or fault. Every mote that is in the range of the target, participates in the determination of the target position by exchanging sensor as well as preprocessed data with its neighboring motes. In our example, we now consider a situation as sketched in FIG. 6 where the true position of the target to be tracked is the solid shape 610, and the dashed shapes 612 illustrate different calculated target positions. The calculation of the target's position differs substantially among the motes, meaning that there is no consensus on where the target actually is.

In other words, the recognition of this erroneous situation cannot be done locally in the code that runs on one of the sensor devices; each of the motes has calculated a target position based on the data it has available. Thus, the defect is only detected by analyzing the system state as a whole, which implies that the reaction to it must also be a coordinated endeavor. In our approach, the collaborative recognition of the faulty situation is part of the system's self-debugging model specification; using COGE, we are able to generate distributed code for the individual hardware devices from that specification. For the recognition task this would, for instance, trigger the exchange and analysis of target position information after the individual mote has this and analysis of target position information after the individual mote has this information available.

4.2. Classification

The task of the classification phase is to distinguish between certain kinds of attacks and/or faults. This classification is needed to trigger suitable self-debugging mechanisms, which will be carried out in the response phase. The classification phase further analyzes the situation and tries to narrow down what has caused it. For this example application, the classification model has the ability to distinguish between one or more of the following four faults:

(1) hardware or software defects on some of the sensor devices, (2) malicious attacker infiltrating false data into the sensor network, (3) malicious attacker broadcasting huge amounts of random data to the sensor network, or (4) the situation that more than one target has entered the monitored area.

The classification result not only reflects decisions made based on these analyses, but also on probabilities based on, for instance, the environment where the system is deployed. In case the calculated target positions do not show any regularities like clustering, the classification assume one of the cases (1), (2), or (3). The case (3) can be distinguished from the cases (1) and (2) by, for instance, analyzing the data throughput in the network. If only a few messages come through in a given time period then it is more likely that an intruder is trying to flood the network with random messages. We assume that the intruder in case (2) decisively tries to send data in a way that the attack isn't immediately revealed. If the intruder would infiltrate obviously wrong data, simple sanity checks in the core application would already reject this kind of data; a technique often used in fault-tolerant algorithms.

The symptoms of cases (1) and (2) are similar, so that the decision, which one of these has more likely occurred can be based on knowledge of where the system is being deployed: if the sensor devices are being dropped into hostile territory during a military conflict, then case (2) seems to be more likely, otherwise the system assumes that hardware defects on one or more motes have occurred. Case (4) represents an interesting situation, because the recognition of the "erroneous" situation gives rise to actually extending the capability of a system by means of self-debugging. This case is chosen by the classification phase to be the most likely one, if the calculated target positions are noticeably clustered. In this case, the ultimate goal of our self-debugging approach is the synthesis of an enhanced version of the target tracking system, which is capable to also track multiple targets. The result of the classification phase is a priority list of attack/fault categories which forms the basis for the response phase.

4.3. Response

Based on the result of the classification phase, the response phase realizes the (coordinated) actions in response to the attack or fault. The ultimate goal of this phase is to bring the entire system 600 back to a legal state without help from outside. On completion of this phase, the system 600 will have healed itself by applying the self-debugging strategies already built into the system. In general, the response phase is guided by the results of the classification phase to fix the order in which strategies have to be activated. For our example scenario, we will briefly describe the actions to be taken for each of the four cases listed in the previous section.

For case (1), the case of hardware and/or software defects on some motes, the system as a whole tries to figure out which ones are working and which ones are not. The self-debugging strategy in this case may be based on using distributed Bayesian inference rules in order to narrow down the set of defective devices. The system thereby exploits the way the target tracking algorithm is working internally: not all motes are exchanging data with all others; in the target tracking algorithm, a mote only uses sensor measurements and distance estimates from a restricted number of neighbors. If the system determines that motes that are not using the data provided by a certain mote X have a high degree of consensus in their calculated target estimations, we would include mote X in the candidate list for defective devices. Another indication that a mote is defective might be the fact that sensor data changes randomly from measurement to measurement, although this cannot be the case based on assumptions that can be made, for instance, about the speed of the target or the position of the motes. Using these kinds of rules, the system is able to isolate the defective ones from the rest, so that the system can re-run the target tracking algorithm only using presumably "good" data from functioning motes. As a last resort, in case the system could not find any obvious candidates using inference techniques, the system still can apply a trivial trial-and-error method to determine the defective motes.

Figure 7:
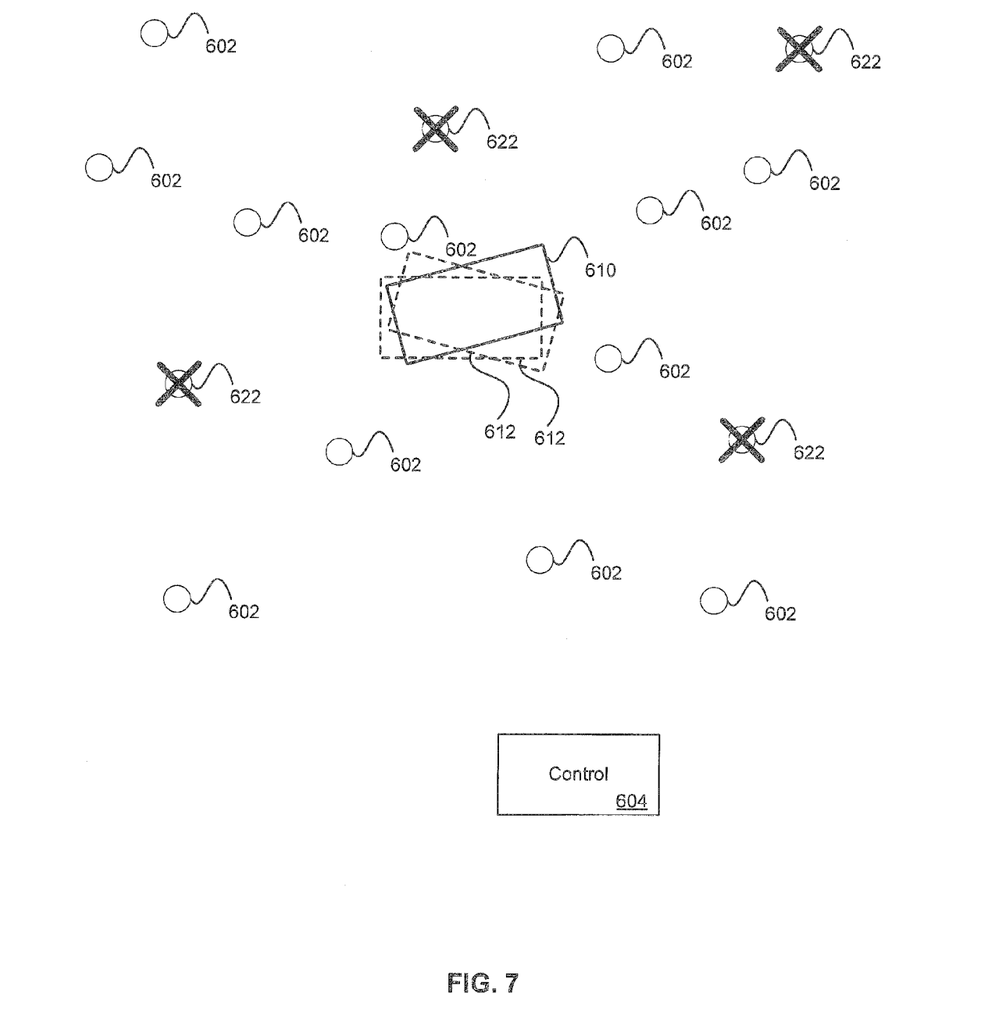
FIG. 7 illustrates eliminating defective sensor devices from the sensor system of FIG. 6.

FIG. 7 shows a possible solution after eliminating defective sensor devices 622 from the determination of target position estimates. As it is sketched in the picture, the degree of consensus (regarding the true position 610) among the remaining motes is very high as the dashed shapes 612 indicate. Case (2) can in principle be addressed in a similar way as stated above for case (1); the difference is that instead of assuming motes to have hardware defects, we consider them to be malicious attackers infiltrating the network with false data. A more advanced, but much more challenging response strategy in case of an intruder, is to further analyze the attacker and try to find certain patterns in its behavior and/or the broadcasted data. With this more advanced analysis future attacks could be detected at an earlier stage. For example, an attack can potentially be anything that could harm or do damage to the system. This could be malicious code or a pattern of behavioral actions that could lead to a risky system. How can the pattern be detected and what does it mean? According to one embodiment, the recognition of the pattern is based on a combination of pattern recognition techniques using discrete analysis, feature extraction, error estimation, cluster analysis (together sometimes called statistical pattern recognition), grammatical inference and parsing (syntactical pattern recognition character). According to another embodiment, the pattern may be recognized by predicting the outcomes of execution by using a predictive model and comparing the predicted outcomes with the observed ones.

We can regard the case (3), that the sensor network is exposed to malicious attacks trying to interfere with the radio transmission between the motes, as a form of denial of service (DOS) attack on the network. One possible response is that the system changes the protocol being used for communicating data across the sensor network. The new protocol should then be one that has been proven to be resistant against DOS attacks.

In case (4), where the system has discovered that more than one target has entered the monitored area, we declare this state no longer as illegal and restart the target tracking for each of the mote clusters separately. In some sense this is similar to the case (1), because for each of the clusters the motes that are not part of it are considered "bad" and are excluded from the (geographically) local computation of a particular target. According to one embodiment, the assignment of motes into clusters may be made according to an iterative process. For example, the system initially assumes two targets and assigns the motes into two clusters. A particular mote may be initially assigned to a cluster based on information such as the mote's identifier. Then the system performs tracking as described above. If there are still errors, the system re-assigns one or more motes to the other cluster, and performs tracking as described above. If there are still errors, the system assumes three targets, re-assigns the motes as described above, and performs tracking as described above. In this manner, the system performs iterative adjustments. A limit or other threshold may be set, such that if a mote is re-assigned more than the threshold number of times, that mote is determined to be defective and is excluded from further clustering.

4.4. Protection

The protection phase represents a noteworthy aspect of embodiments of the present invention. It represents the phase, where the re-synthesis is done based on an updated environment the system has learned during the recognition, classification, and response phase. With "learning" we do not mean full machine learning in the traditional sense, but we mean that the system collects additional information about its environment, such that it is able to adapt the synthesis process to the changed situation.

In our example cases (1) and (2) the system adjusts the environment model in a way that we explicitly express the defectiveness of certain motes (note the pathways 126 in FIG. 1). The COGE synthesis engine (e.g., the refinement and code generation module 104) then uses this information to generate code that filters out data from these motes for the remaining ones. In case, the system was able to extract some kind of attack pattern of a malicious intruder this could in the same sense be used to adjust the environment model.

In case the system assumes software defects on the non-correctly operating motes, the re-synthesis could be used to upload new code on these motes, resulting in a situation where the regeneration of the code has completely healed the system from the detected failure. The idea here is to separate protocol properties like, for instance, being immune against certain kind of attacks, and synthesize customized protocols having the desired properties In our example, we could then upgrade the existing protocol to one that resists denial of service attacks.

Finally, in case of multiple targets, the re-synthesized code could directly check for this kind of clustering, which has been discovered in the classification phase. This is also a regeneration based on a changed environment model; in this case from one that assumes exactly one target to one that does not have this restriction.

5. Example Application: Data Processing System

Figure 8:
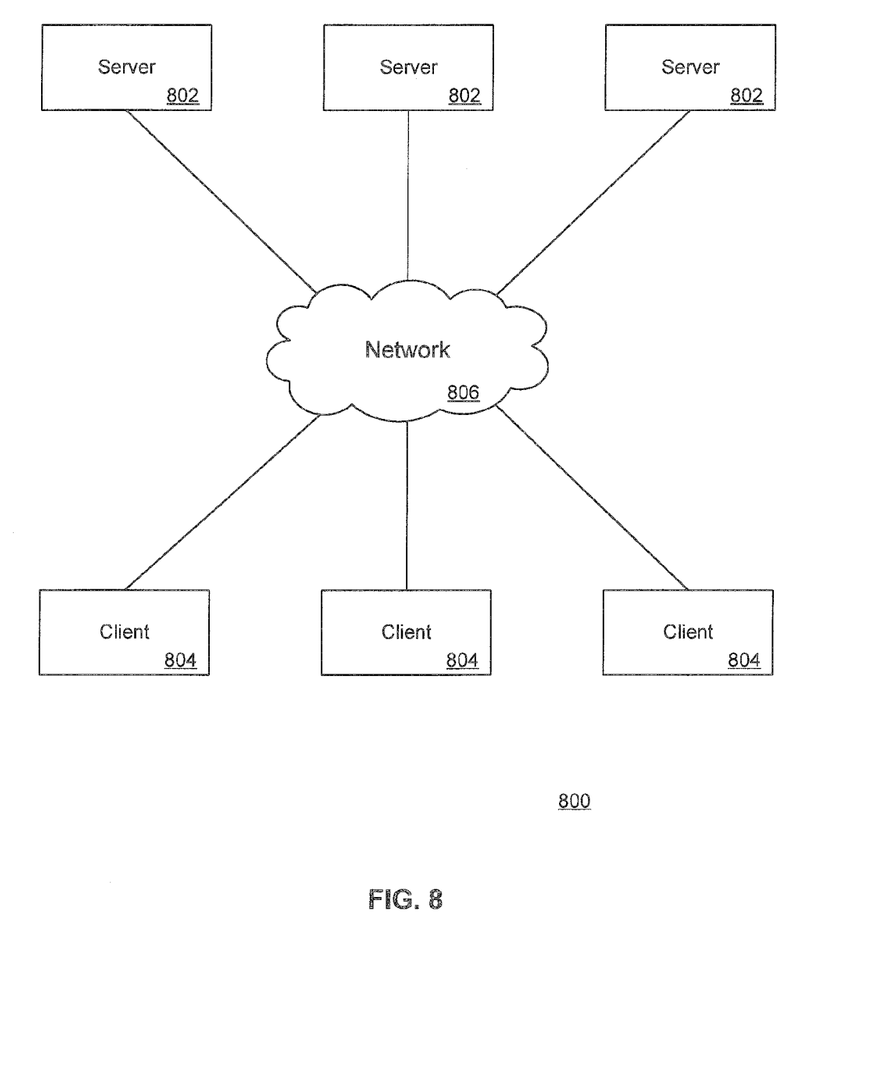
FIG. 8 is a block diagram of a distributed business logic processing system according to another embodiment of the present invention.

FIG. 8 is a block diagram of a distributed business logic processing system 800 according to another embodiment of the present invention. The system 800 includes a number of distributed data processors (servers) 802 and a number of clients 804 that communicate via a network 806. The servers 802 and the clients 804 may be computing devices similar to the computer system 510 (see FIG. 5). According to one embodiment, the servers 802 implement a distributed computer program for transactional or aggregative processing and the clients 804 implement a computer program for data entry and display. As a specific example, the system 800 may implement an applications environment such as Business ByDesign™ environment from SAP AG, Walldorf, Germany. One or more of the servers 802 may implement the computer program 300 (see FIG. 3) and the method 400 (see FIG. 4).

Error and conflict handling in existing Business ByDesign™ systems is a manual process, which involves time and may itself introduce errors. Embodiments of the present invention may be used to improve error and conflict handling in Business ByDesign™ systems.

In modern business applications like SAP's Business ByDesign™ environment the business logic is no longer contained in a single application unit running on a single computer, but is spread among a number of distributed processors running independently from each other (see servers 802 in FIG. 8). That means also that traditional error and conflict handling techniques, which mainly focus on transactional integrity on database level, no longer apply in this distributed environment. Due to the independence of the individual business components and the absence of a centralized coordination component (which would defeat the purpose of the flexibility of having a decentralized application) conflicts in the flow of the business process can occur at any stage of the business process. For instance, if one component rejects a change in business related data, but another one has already accepted it and continued to work on the updated data, the entire business process is out of sync and the conflict needs to be resolved on a business logic level. This more often than not involves human intervention, because many of the problems involve complex decision making.

Embodiments of the present invention help solve the above stated problem of business-level error and conflict handling through Business Process Self Debugging. This means that through the integration of Self Debugging functionality errors and conflicts like the one described above may be dealt with in a highly automated way by the system itself with only minimal and ideally no human intervention Self debugging works on the business logic level rather than on a technical communication level and is able to detect, analyze, and heal a business process that is affected by an error and/or conflict. In practice, the self-debugging functionality acts as an autonomous agent that monitors the system activities and becomes active at latest when an error or conflict has occurred. The term "Self-Debugging" alludes to the fact that the system is in principle able to recover from erroneous situations by itself, as it is the case for the self-healing of organisms in biology.

A functional business process self-debugging system locates and isolates problems and then executes a remedy. A prerequisite for this task is the ability of the system to recognize the "danger", to hold off the possibility of an error and/or conflict situation, and finally to take actions to protect the system in future from similar situations.

For the implementation of this concept the following major stages can be identified:

(1) Recognition: The system recognizes that there is a potential risk of an error and/or conflict situation being imminent.

(2) Classification: The ability of the system to determine the type of error and/or conflict and any potential damage that could harm the system.

(3) Response: Once the system recognizes the type of error or conflict, it activates its own rules and mechanisms to defend itself and to overcome and resolve the situation.

(4) Protection: The ability of the system to build protection against predictable error and conflict situations.

In all these stages the self-debugging component uses information previously learned from similar situations. That means that over time the self-debugging functionality becomes more powerful, because it learns the actions taken by the user and uses that information to prevent and/or resolve errors and conflicts in the future. Self-debugging allows for a much earlier detection of situations that potentially could lead to a conflict, and thus can raise a red flag when certain patterns in the actual business process execution occur.

Thus, the self-debugging component makes its decisions based on 1) business logic rules and 2) previous events that have caused errors or conflicts.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of self-debugging a computer program operating in a distributed processing environment, comprising:

detecting, by a control device, a fault in a plurality of processing devices operating in the distributed processing environment, wherein the distributed processing environment relates to a physical environment as opposed to an internal environment that is local to a processing device of the plurality of processing devices, and wherein the fault is detected by analyzing the plurality of processing devices as a whole as opposed to the internal environment that is local to the processing device;

classifying the fault into at least one of a plurality of fault classifications, wherein the plurality of fault classifications have a plurality of responses that correspond thereto; and wherein the plurality of fault classifications have a plurality of probabilities based on the physical environment of the distributed processing environment;

executing one of the plurality of responses in accordance with the fault having been classified to generate new code that addresses the fault; and revising the computer program according to the response, wherein revising the computer program includes uploading the new code from the control device to at least one of the plurality of processing devices that is associated with the fault, wherein the self-debugging refers to the plurality of processing devices as the whole, not to code on each of the plurality of processing devices.

2. The computer-implemented method of claim 1, further comprising:

storing a model specification that corresponds to the computer program; and generating the computer program from the model specification.

3. The computer-implemented method of claim 1, further comprising:

storing a model specification that corresponds to the computer program, wherein the step of revising the computer program includes:
    revising the model specification according to the response; and
    generating the computer program from the model specification having been revised.

4. The computer-implemented method of claim 1, further comprising:
    storing an environmental model that corresponds to the distributed processing environment, wherein the step of revising the computer program includes:
        revising the environmental model according to the response; and
        generating the computer program from the environmental model having been revised.

5. The computer-implemented method of claim 1, wherein the distributed processing environment comprises a plurality of distributed processors, and wherein the computer program comprises:
    a plurality of subprograms executed by the plurality of distributed processors; and
    a debugging program that executes the steps of detecting, classifying, executing and revising.

6. The computer-implemented method of claim 1, wherein the distributed processing environment comprises a plurality of distributed processors, and wherein the computer program comprises:
    a plurality of subprograms executed by the plurality of distributed processors; and
    a debugging program that executes the steps of detecting, classifying, executing and revising,
    wherein the fault comprises a data discrepancy between at least two of the plurality of subprograms, and
    wherein the step of revising the computer program includes not using data from at least one of the plurality of subprograms that is related to the fault.

7. The computer-implemented method of claim 1, wherein the distributed processing environment comprises a plurality of distributed processors, and wherein the computer program comprises:
    a plurality of subprograms executed by the plurality of distributed processors; and
    a debugging program that executes the steps of detecting, classifying, executing and revising,
    wherein the fault comprises a data discrepancy between at least two of the plurality of subprograms, and
    wherein the step of revising the computer program includes rolling back processing by at least one of the plurality of subprograms.

8. A computer program, tangibly embodied in a non-transitory computer-readable medium, for implementing self-debugging processing in a distributed processing environment, the computer program comprising:
    a plurality of subprograms executed by a plurality of processing devices operating in the distributed processing environment; and
    a debugging program, executed by a control device, that controls the control device to execute processing comprising:
        detecting a fault in the plurality of processing devices operating in the distributed processing environment, wherein the distributed processing environment relates to a physical environment as opposed to an internal environment that is local to a processing device of the plurality of processing devices, and wherein the fault is detected by analyzing the plurality of processing devices as a whole as opposed to the internal environment that is local to the processing device;
        classifying the fault into at least one of a plurality of fault classifications, wherein the plurality of fault classifications have a plurality of responses that correspond thereto, and wherein the plurality of fault classifications have a plurality of probabilities based on the physical environment of the distributed processing environment;
        executing one of the plurality of responses in accordance with the fault having been classified to generate new code that addresses the fault; and
        revising the computer program according to the response, wherein revising the computer program includes uploading the new code from the control device to at least one of the plurality of processing devices that is associated with the fault,
    wherein the self-debugging refers to the plurality of processing devices as the whole, not to code on each of the plurality of processing devices.

9. The computer program of claim 8, further comprising:
    an environment module that stores an environmental model that corresponds to the distributed processing environment, wherein revising the computer program includes:
        revising the environmental model according to the response; and
        generating the computer program from the environmental model having been revised.

10. The computer program of claim 8, further comprising:
    a system specification module that stores a model specification that corresponds to the computer program, wherein revising the computer program includes:
        revising the model specification according to the response; and
        generating the computer program from the model specification having been revised.

11. The computer program of claim 8, wherein a model specification corresponds to the computer program, further comprising:
    a refinement and code generation module that generates the computer program from the model specification.

12. The computer program of claim 8, wherein the fault comprises a data discrepancy between at least two of the plurality of subprograms, and wherein revising the computer program includes not using data from at least one of the plurality of subprograms that is related to the fault.

13. The computer program of claim 8, wherein the fault comprises a data discrepancy between at least two of the plurality of subprograms, and wherein revising the computer program includes rolling back processing by at least one of the plurality of subprograms.

14. A computer system for performing self-debugging processing in a distributed processing environment, comprising:
    a plurality of processing devices operating in the distributed processing environment; and
    a computer program, tangibly embodied in a non-transitory computer-readable medium, executed by the plurality of distributed processors and a control device, the computer program including:
        a plurality of subprograms executed by the plurality of distributed processors; and
        a debugging program, executed by the control device, that controls the control device to execute processing comprising:

detecting a fault in the plurality of processing devices operating in the distributed processing environment, wherein the distributed processing environment relates to a physical environment as opposed to an internal environment that is local to a processing device of the plurality of processing devices, and wherein the fault is detected by analyzing the plurality of processing devices as a whole as opposed to the internal environment that is local to the processing device;

classifying the fault into at least one of a plurality of fault classifications, wherein the plurality of fault classifications have a plurality of responses that correspond thereto, and wherein the plurality of fault classifications have a plurality of probabilities based on the physical environment of the distributed processing environment;

executing one of the plurality of responses in accordance with the fault having been classified to generate new code that addresses the fault; and revising the computer program according to the response, where revising the computer program includes uploading the new code from the control device to at least one of the plurality of processing devices that is associated with the fault, wherein the self-debugging refers to the plurality of processing devices as the whole, not to code on each of the plurality of processing devices.

15. The computer system of claim 14, wherein the plurality of processing devices comprises:

a plurality of sensor nodes that execute the plurality of subprograms; and a control node that executes the debugging program.

16. The computer system of claim 14, wherein the plurality of processing devices comprises:

a plurality of servers that execute the plurality of subprograms, wherein one of the plurality of servers executes the debugging program.

17. The computer system of claim 14, wherein the computer program further comprises:

an environment module that stores an environmental model that corresponds to the distributed processing environment, wherein revising the computer program includes:

revising the environmental model according to the response; and generating the computer program from the environmental model having been revised.

18. The computer system of claim 14, wherein the computer program further comprises:

a system specification module that stores a model specification that corresponds to the computer program, wherein revising the computer program includes:

revising the model specification according to the response; and generating the computer program from the model specification having been revised.

19. The computer system of claim 14, wherein the fault comprises a data discrepancy between at least two of the plurality of subprograms, and wherein revising the computer program includes not using data from at least one of the plurality of subprograms that is related to the fault.

20. The computer system of claim 14, wherein the fault comprises a data discrepancy between at least two of the plurality of subprograms, and wherein revising the computer program includes rolling back processing by at least one of the plurality of subprograms.

* * * * *